A. N. SEVERANCE.
Cheese Shelf.
No. 5,093.
Patented May 1, 1847.
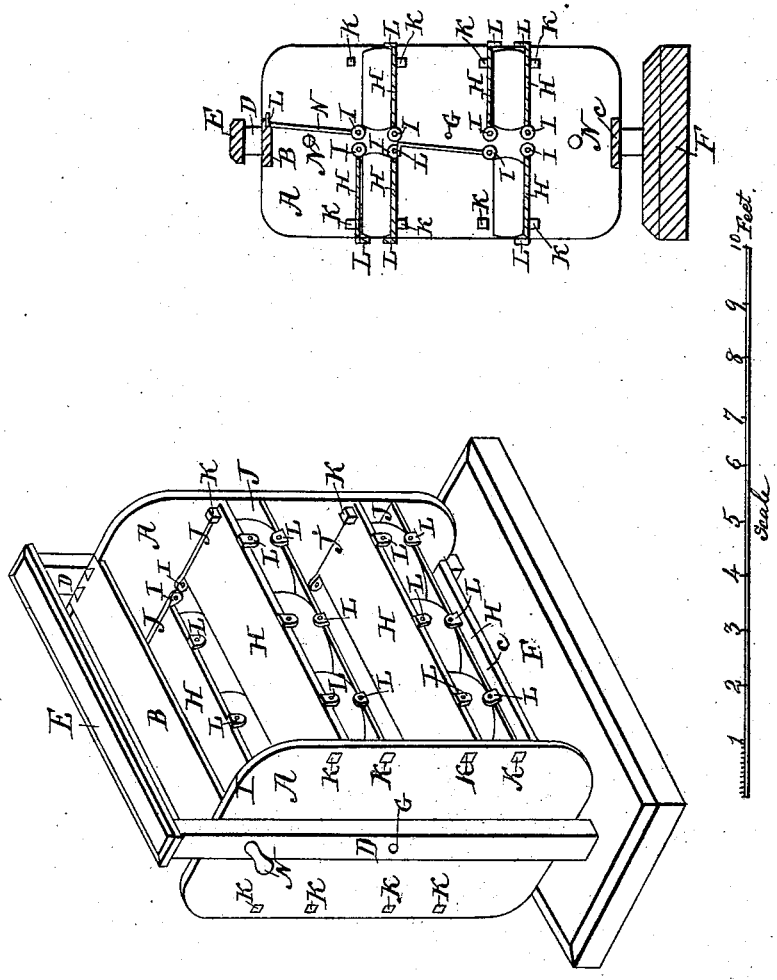
Witnesses.
Wilson S. Black
Thos Varner
Inventor
Augustus N Severance

UNITED STATES PATENT OFFICE.

A. N. SEVERANCE, OF CHERRY VALLEY, OHIO.

CHEESE-SHELF.

Specification of Letters Patent No. 5,093, dated May 1, 1847.

*To all whom it may concern:*

Be it known that I, AUGUSTUS N. SEVERANCE, of Cherry Valley, in the county of Ashtabula and State of Ohio, have invented a new and Improved Machine for Turning Cheese, During the Course of Curing the Same; and I do hereby declare that the following is a full and exact description of the same.

The nature of my invention consists in providing shelves, which revolve upon an axle, and turn upon pivots, or gudgeons, whereby either side of the cheese may be exposed by the dairyman to the air and operation of curing.

To enable others to make and use my invention, I will proceed to describe its construction and operation, reference being had to the annexed drawings making a part of these specifications.

A, A, are end pieces, B, C, top and bottom pieces, firmly framed together, forming a suitable sized frame in which four sets of upper and lower shelves, H, H, and S, S, may be placed. The shelves are formed of boards with clamps J, across their ends projecting from one edge at the corners. The frame being upright, two sets of shelves, are placed in the upper part of the frame. The upper shelves of the two sets, are placed horizontally opposite to each other. The lengths of their clamps from the top piece. The other two shelves of these sets are placed far enough below the upper shelves to admit of cheese between them, and one half the length of their clamps from midway of the end pieces through the projections of the clamps, are placed pivots into the end pieces forming a kind of hinge shown by I, I, on which the shelves may be turned. Through the end pieces near their edges under and over each set of shelves into the sides of the clamps, are placed movable pins forming shelf supporters, shown by R, so that the cheese will rest in all positions of the frame, equally on the supporters and hinges. The two other sets of shelves are placed in the lower part of the frame in like manner. On the edge of the shelves opposite where the center of each cheese will be placed, are fastened buttons, L, to prevent the cheese from falling when the frame is revolving. Through the frame at the center of the end pieces, is placed the axle G, projecting each way from the frame, into posts D, which posts stand perpendicular in base F, confined at the top by beam E, thus the frame is suspended, and may be revolved upon its axle. The frame is kept upright by pin N, through post D, into end piece A. The machine thus complete, may be used by pressing the upper movable pins of each set through the end pieces far enough to admit of the shelves being raised. Turn the upper shelves upon their hinges until their upper edges rest together. Cheese may now be placed on the lower shelves of each set being exposed to all curing processes. When it is desired to expose the other sides of the cheese to curing processes, turn the upper shelves of each set down on their hinges, secure them by the movable pins remove pin N, and turn the frame half around upon its axle, then the shelves on which the cheese rested before the frame was turned are now the upper shelves, and may be turned up on their hinges as the others were. Thus the dairyman is enabled to turn any number of cheese, according to the size and strength of the machine, in less time and with less labor than is required to turn one, in the common way, avoiding also the liability of cracking cheese when new by turning them by hand.

What I claim as my invention, and desire to secure by Letters Patent, is—

The combination of shelves H, H, S, S, with the revolving frame substantially in the manner and for the purpose set forth.

AUGUSTUS N. SEVERANCE.

Witnesses:
F. L. GOBLE,
SIMEON HUBBARD.